United States Patent [19]

Lee

[11] 4,350,591

[45] Sep. 21, 1982

[54] DRILLING MUD CLEANING APPARATUS

[76] Inventor: Joseph E. Lee, 1802 Crestview, Kilgore, Tex. 75662

[21] Appl. No.: 198,920

[22] Filed: Oct. 20, 1980

[51] Int. Cl.³ .............................................. B01D 33/04
[52] U.S. Cl. .................................... 210/384; 55/192; 55/199; 210/400
[58] Field of Search ............... 210/384, 388, 398, 472, 210/400, 401; 55/183, 192, 196, 199

[56] References Cited

U.S. PATENT DOCUMENTS

| | | | |
|---|---|---|---|
| 2,294,827 | 9/1942 | Booth | 55/196 X |
| 2,714,308 | 8/1955 | Heck | 56/199 |
| 3,464,557 | 9/1969 | Fowler | 210/401 |
| 4,046,528 | 9/1977 | Liljestrand | 55/192 X |
| 4,146,483 | 3/1979 | Lee . | |
| 4,154,689 | 5/1979 | Ootani | 210/401 |
| 4,175,039 | 11/1979 | Fisher . | |

OTHER PUBLICATIONS

"Clean Screen Machine", Par Industries, Inc., brochure.

"Baroid Double Deck Shaker, for Better Solids Control to Reduce Drilling Cost", NL Industries, brochure.

Primary Examiner—John Adee
Attorney, Agent, or Firm—Arnold, White & Durkee

[57] ABSTRACT

Apparatus for cleaning cutting-laden drilling mud utilizes an upwardly inclined traveling belt screen. Successive portions of the screen are established as a planar screen surface supported by an underlying grille. A vibration unit attached to the grille imparts vibrating movement to the screen to more effectively separate cuttings from drilling mud deposited thereon. A vibratory plate is immersed in the puddle of mud which forms over an aft section of the inclined planar screen surface and acts to compact the mud and enhance its penetration therethrough. An auxiliary gas break-up screen disposed in the path of mud being directed toward the belt screen causes the release of gases contained in the cutting-laden drilling mud, and a blower driven vented enclosure hood placed over the gas break-up screen captures and exhausts released gases.

5 Claims, 10 Drawing Figures

DRILLING MUD CLEANING APPARATUS

BACKGROUND OF THE INVENTION

The present invention relates to apparatus for removing solid particles, such as cuttings and shale, from oil well drilling mud.

In rotary drilling of oil and gas wells, an emulsion, or "mud", is continuously circulated down through the drill string and back up to the surface through the annulus surrounding the drill string to wash away cuttings produced by the drill bit. Before recirculating particle-laden drilling mud, the cuttings therein must be removed. Apparatus to perform this separation function is known in the art as "shale shakers." The apparatus is also referred to as "cuttings separators" and as "drilling mud cleaning screens."

In prior art apparatus, particle-laden drilling mud is deposited on a stationary screen panel acting as a strainer to catch cuttings while allowing mud to drain through for collection. To enhance the removal process by preventing clogging of the screen, the screen is downwardly inclined and vibrated. Other known cuttings separator apparatus has utilized an endless conveyor belt screen to catch cuttings and dump them off the end.

SUMMARY OF THE INVENTION

Recognizing the need for improved drilling mud cleaning apparatus, the present invention provides several novel features not found in either the structure or operation of prior art apparatus.

In accordance with the present invention, a traveling belt screen is disposed within a housing. A grille structure underlies a portion of the traveling screen belt to support the same from underneath and establish successive portions thereof as a planar screen surface. A vibrator unit attached to the grille produces vibration of the screen in all directions without lateral tensioning of the screen.

Further in accordance with the present invention, the traveling belt screen is upwardly inclined. By reason of the upwardly inclined orientation of the planar screen surface portion, cutting-laden drilling mud deposited thereon forms a puddle over an aft section thereof. To further enhance separation, a mud compactor is provided which comprises a plate immersed in the puddle of mud and vibrated. Compaction of the mud serves to force mud through the traveling screen and increase the rate of mud penetration therethrough during the cuttings separation operation.

Another novel feature of drilling mud cleaning apparatus in accordance with one aspect of the present invention, and not heretofore found in prior art apparatus, is the provision for de-gassing drilling mud fluid returning from down hole. In one embodiment, to accomplish this feature, drilling mud drops onto an auxillary gas break-up screen disposed in the apparatus housing, causing gas contained in the mud to be released. A blower-driven, vented enclosure hood is placed over the housing and pulls released gases therethrough into an exhaust outlet.

These and other features of the invention are more completely described in the detailed description of an illustrative embodiment which follows.

BRIEF DESCRIPTION OF THE DRAWINGS

A written description setting forth the best mode presently known for carrying out the present invention, and of the manner of implementing and using it, is provided by the following detailed description of a preferred embodiment illustrated in the attached drawings in which.

DETAILED DESCRIPTION OF AN ILLUSTRATIVE EMBODIMENT

Figure 1:
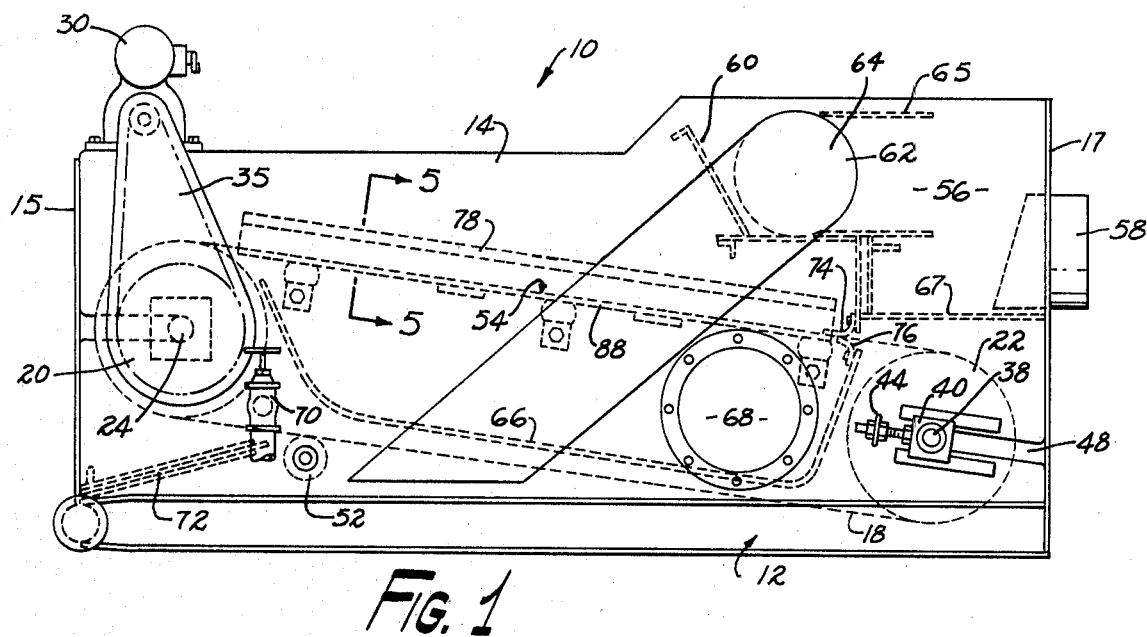
FIG. 1 is a right side elevation view of drilling mud cleaning apparatus in accordance with the present invention.
Figure 2:
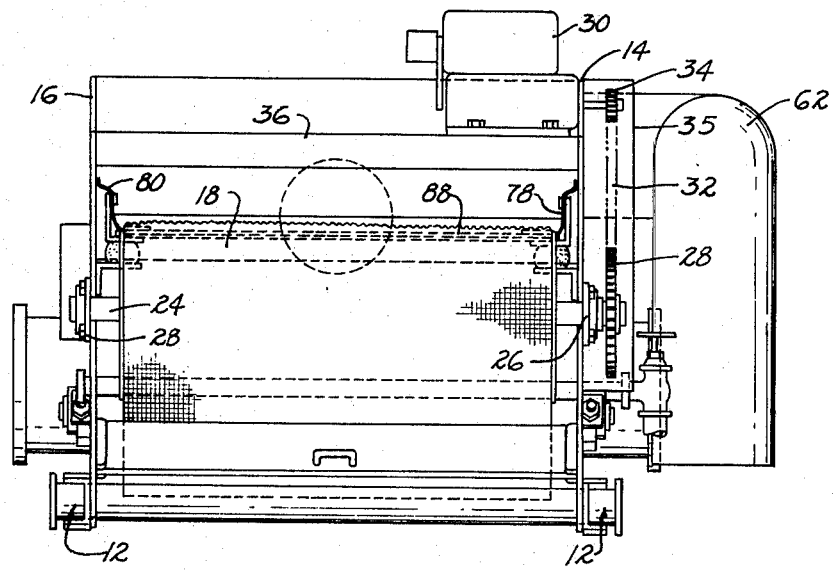
FIG. 2 is a front view of the apparatus.

Referring to FIGS. 1-4, there is shown in left and right side elevation, plan and frontal views an embodiment or drilling mud cleaning apparatus in accordance with the present invention. The overall structure is generally indicated by the reference numeral 10. The apparatus is shown mounted on skids 12 making it suitable for placement on the platform of a drilling rig. The apparatus comprises a housing having laterally spaced, upwardly standing sidewalls 14 and 16. The sidewalls attach to skids 12. The housing also includes front and back walls 15 and 17, respectively.

An open area is defined between the sidewalls in which an endless travelling belt screen 18 is disposed. Screen 18, which will be described in more detail in connection with a discussion of FIG. 5, functions to filter cuttings from drilling mud deposited on the screen. Belt screen 18 travels along a loop travel path defined by forward and aft rollers 20 and 22. Forward roller 20 is mounted for rotation on an axle 24 extending between sidewalls 14 and 16. Axle 24 turns on bearings 26 and 28, which are mounted to sidewalls 14 and 16, respectively.

Axle 24 extends beyond bearing 26 and has sprocket 28 mounted thereon. A drive motor 30 provided with a variable speed control is coupled to forward screen roller 20 by a drive assembly 35 that includes sprocket 28, interconnecting chain 32, and pinion gear 34 on the shaft of motor 30. Drive motor 30 may suitably be a three horsepower DC motor provided with an SCR variable speed controller, all of which is mounted in an explosion proof enclosure. Drive motor 30 is mounted to cross member 36 which extends between sidewalls 14 and 16.

Aft screen roller 22 is similar to forward screen roller 20 and is rotational about an axle 38 which extends between sidewalls 14 and 16. Axle 38 turns in bearings 40 and 42. Unlike bearings 24, 26 for forward roller 20, bearings 40 and 42 are adjustable to provide for forward and aft movement and positioning of the aft roller. Threaded screw mechanisms affixed between a bearing enclosure and its respective sidewall provide the desired adjustment. The bearing housing are movable within slots 48 and 50 in sidewalls 14 and 16, respectively.

Screen 18 loops around the forward and aft rollers. An auxiliary roller 52 is adjustable in position toward and away from screen 18 and provides a means for tensioning belt screen 18. The screen travel path defined by the forward and aft rollers establishes successive portions of the belt screen as a planar screen surface 54. It is into an area of the planar screen surface 54 that cutting-laden drilling mud is deposited from mud-holding chamber 56 in the rear portion of the housing.

Mud to be cleaned is introduced into chamber 56 through inlet port 58 extending through housing backwall 17. The level of mud maintained in chamber 56 is established by baffle plate 60 mounted in the forward portion of chamber 56. A mud by-pass outlet 62 from chamber 56 is also provided, but is normally covered by a sliding plate 64 movable in tracks 65. Mud flowing over the top of plate 60 is discharged onto the planar screen surface 54.

The belt screen 18 serves to filter cuttings from cutting-laden drilling mud deposited on the planar screen surface by permitting drilling mud to penetrate the screen, while straining out the cuttings. Drilling mud penetrating the screen is collected in a tray 66 disposed beneath the planar screen surface 54 and encircled by the endless belt screen 18. A clean mud outlet port 68 extends laterally from tray 66 through sidewall 14.

Cuttings collected on the surface of screen 18 are discharged off the forward end of the belt. To facilitate discharge of the cuttings, a spray of water from pipe 85 is directed against roller 20. Wash water rebounds off the surface of roller 20 and in doing so dislodges cuttings accumulated on the screen. Pipe 85 extends across the front of the apparatus between the sidewalls. Cuttings remaining attached to the surface of the screen after passage over the forward screen roller are dislodged by a spray of wash water from nozzles 86. Both pipe 85 and nozzles 86 are supplied with wash water from valve 70. Cuttings dislodged by the spray of wash water flow down adjustable wash plate 72 and are discharged.

Figure 3:
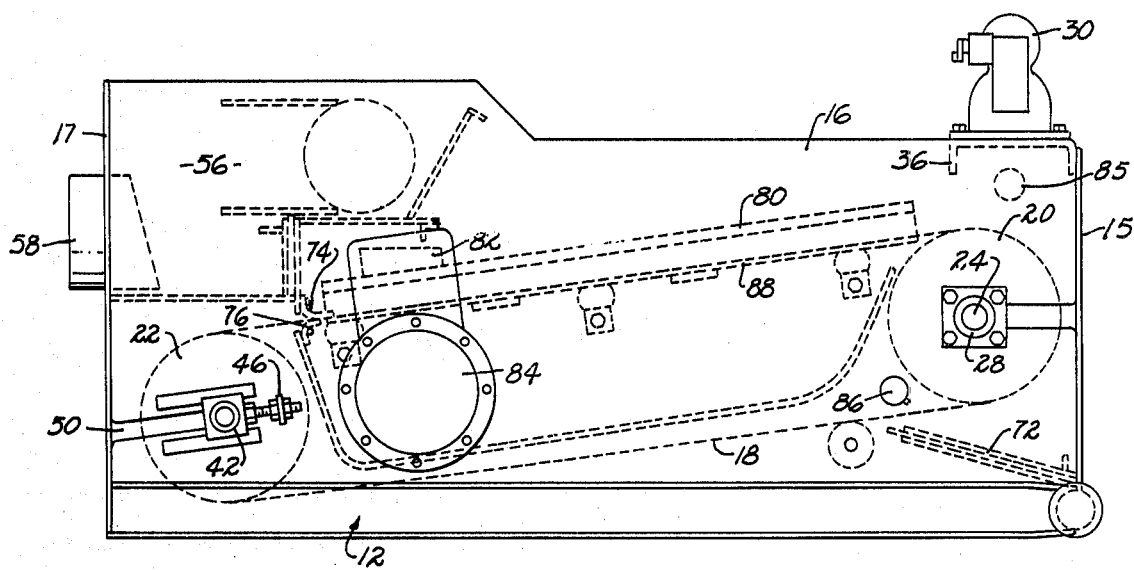
FIG. 3 is a left side elevation view of the apparatus.
Figure 4:
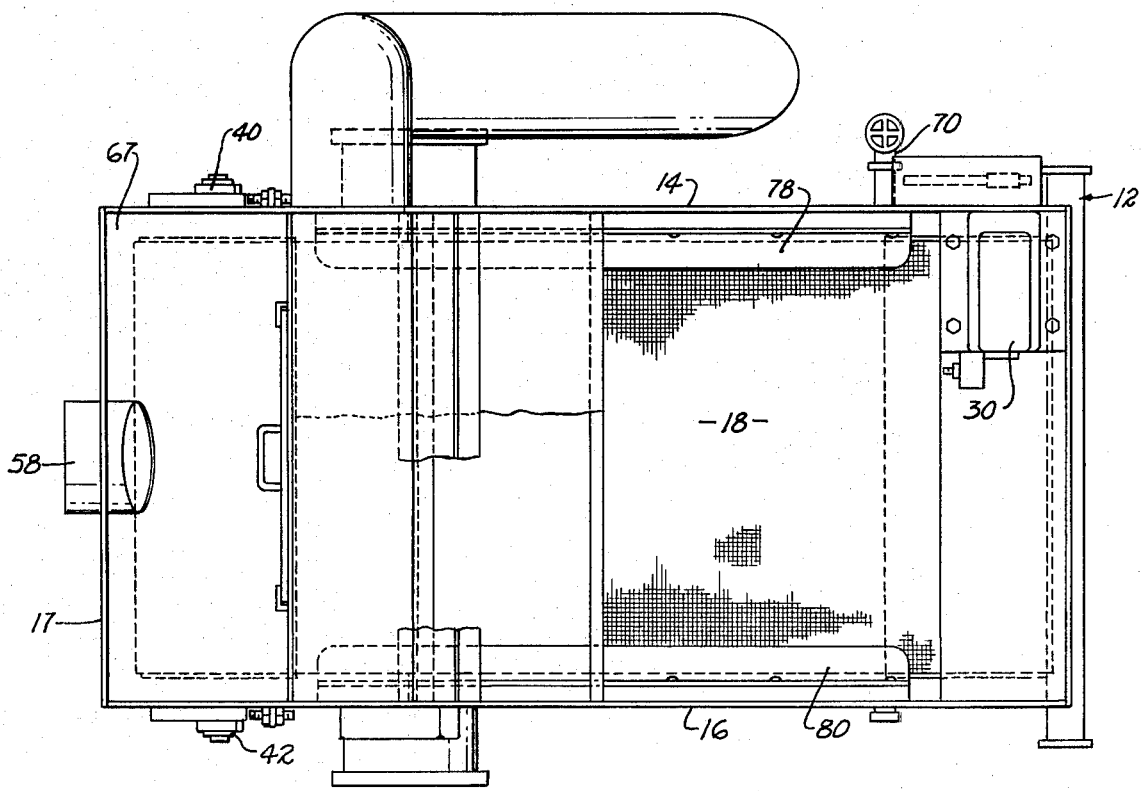
FIG. 4 is a plan view of the apparatus.

By inspection of FIGS. 1 and 3, axle 24 defining the axis of rotation for forward roller 20 is disposed at a first vertical height position which is higher than the aft roller axis of rotation. Accordingly, the planar screen surface 54 is upwardly inclined in the direction of screen travel. This has the effect of increasing the dwell time of deposited mud on the screen surface, which will increase the amount of clean mud penetrating the screen and minimizing the loss of clean mud carried off the end of the screen with retained cuttings. By reason of the inclination of planar screen surface 54, mud deposited thereon will form a puddle. This has the advantageous effect of creating a fluid head which further increases the penetration of clean mud through the screen surface. To prevent mud leakage back seals 74, 76 and side screen seals 78, 80 are provided. Further, by reason of the tendency of mud to puddle, an overflow outlet 82 emptying into mud outlet 84 is provided.

Figure 5:
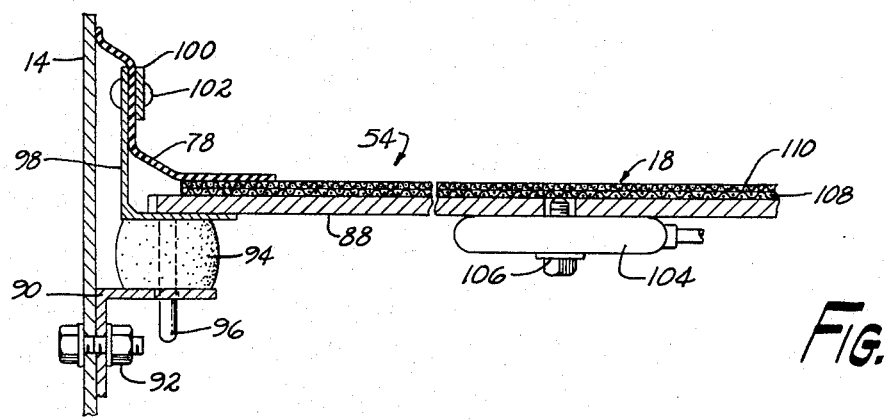
FIG. 5 is a detailed drawing of the vibratory screen grille mounting.

Referring now to FIG. 5, there is presented a drawing of a cross-section of screen 18, and particularly of a portion thereof established as planar screen surface 54. The planar screen surface portion of belt screen 18 is established by an underlying grille structure 88. Grille 88 is resiliently mounted within the housing for yieldable movement in all directions. For example, and as shown, grille 88 is mounted to sidewall, e.g., sidewall 14, by an arrangement comprising an angle iron bracket 90 and bolt assembly 92. A rubber pad 94 is inserted between an inwardly extending arm of angle bracket 90 and grille 88. A pin 96 extending downwardly from the underside of grille 88 passes through rubber pad 94 and inserts through an opening in the inwardly extending arm of bracket 90.

To facilitate attachment of screen seal 78, a seal guide bracket 98 is also attached to grille 88. As shown, this is accomplished by interposing an arm of bracket 98 between the underside of grille 88 and the topside of rubber pad 94. Pin 96 inserts through an opening in the arm of angle bracket 98 to secure the relative positioning therebetween. Screen seal 78 is firmly affixed to the upper arm of bracket 98 by means of a bar 100 and rivet 102.

A vibration unit 104 is attached, for example by threaded fastener 106, to the underside of grille 88. Vibration unit 104 imparts vibrational movement to the planar screen surface 54 to enhance separation of the cuttings from clean mud.

The arrangement shown in detail in FIG. 5 provides for vibration of planar screen surface 54 of screen 18 in all directions without having to tension the screen in the transverse direction (i.e., laterally across the screen surface). It is to be understood, however, that other means for resiliently mounting the grille structure within the housing for yieldable movement in all directions may be utilized. For example, a coil spring may be substituted for rubber pad 94.

Suitably, vibration unit 104 is a pneumatically driven device, such as Global Manufacturing Co., Model US-38, ball-type air pneumatic vibrator.

With regard to the structure of belt screen 18 itself, an endless drive belt made of a metal mesh belt has attached thereto a plurality of screen panels 110. The endless drive belt may suitably be a spiral type belt such as that offered by Cambridge Wire Company under the designation B-36-32-16. In the illustrative embodiment shown in FIGS. 1-4, the belt would be approximately four feet wide and 19 feet long.

Figure 6:
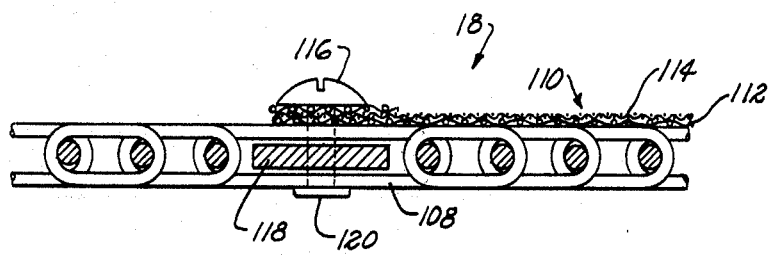
FIG. 6 is a detailed drawing of the traveling belt screen panel structure and the means of connecting screen panels to the belt.

Referring to FIG. 6, there is presented a more detailed drawing of the structure of screen 18. As indicated, the screen panel 110 includes a large mesh screen 112 in combination with a smaller mesh screen overlay 114. Preferably, the screens are bonded together along the edge with neoprene. Each panel is attached to the drive belt by a screw 116 which passes therethrough to a transverse bar 118 extending across the drive belt. Transverse bar 118 is inserted in an elongated wire spiral link which is also made by Cambridge Wire Company. A nut 120 is, of course, included beneath bar 118 for screw 116.

Figure 7:
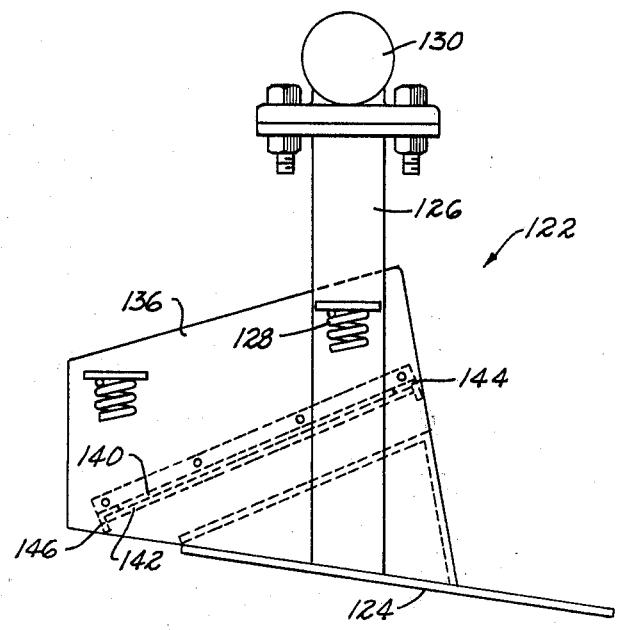
FIG. 7 is a side elevation view of a mud compactor for disposition in the housing of the apparatus of FIGS. 1-4.

Referring next to FIG. 7, in order to provide additional agitation of drilling mud deposited on planar screen surface 54, to thereby force drilling mud fluid through the screen, a mud vibrator/compactor unit 122 may be provided as an additional attachment to the apparatus of FIGS. 1-4. The mud vibrator/compactor unit is a vibrator for the mud itself, and not for the screen. The unit includes a solid plate 124 for immersion in the puddle of drilling mud which accumulates over the aft portion of planar screen surface 54. The plate is resiliently, but flexibly mounted in the housing opening between the sidewalls for vertical movement. Furthermore, the plate preferably should extend substantially parallel to the planar screen surface. In order to resiliently mount compaction plate 124 in the housing, vertical mounting structure 126 extends from plate 124 and has attached thereto coil spring mounting devices 128. A vibrator 130 is mounted atop structure 126 and produces vertical vibrational movement of plate 124.

Figure 8:
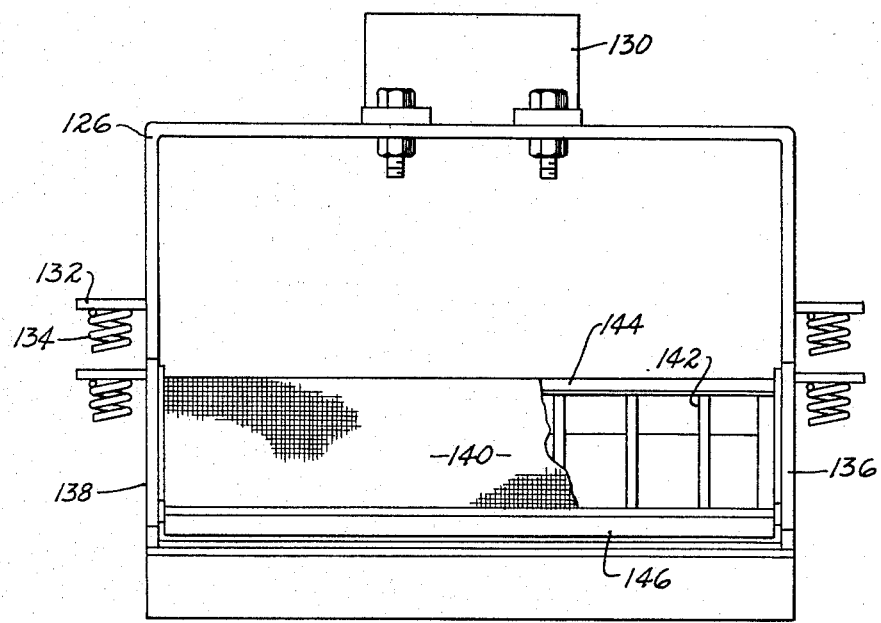
FIG. 8 is a front view of the mud compactor of FIG. 7.

Referring to FIG. 8, the vertical mounting structure 126 for vibrator 130 may suitably be an inverted U-shaped bracket. Spring mounting devices 128 may suitably comprise a mounting ear, for example ear 132, attached to the side of the bracket and having a spring 134 downwardly depending therefrom.

Further in accordance with the present invention, degassing returned drilling mud fluid may be realized. This is accomplished in one fashion by providing one or more screens upon which drilling mud falls and penetrates prior to being deposited onto planar screen surface 54 for cuttings separation. Referring again to FIGS. 7 and 8, a gas breakup screen may suitably be incorporated with the structure of mud vibrator/compactor 122. As shown in FIGS. 7 and 8, side plates 136, 138 may be provided and a screen 140 stretched thereacross. The screen is also provided with uniform support by a number of spaced-apart support bars 144 extending between transverse angle frame members 144 and 146.

Figure 10:
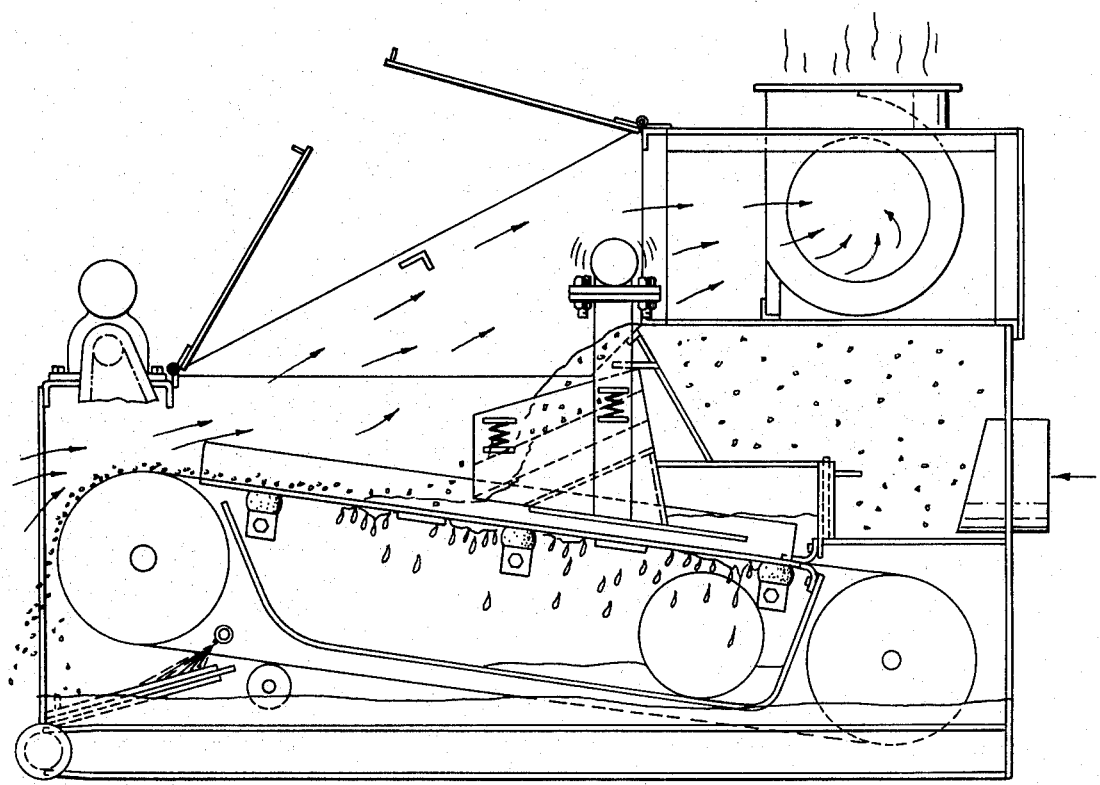
FIG. 10 is an elevation view of the apparatus of FIGS. 1-4 with the mud compactor of FIGS. 7 and 8 and the enclosure hood of FIG. 9 in place.

To further illustrate the manner in which mud vibrator/compactor unit 122 and the gas break-up screen 140 is utilized in the apparatus of FIGS. 1-4, there is presented in FIG. 10 an elevation view of the apparatus of FIGS. 1-4 provided with the optional equipment of FIGS. 7 and 8.

Gases released through de-gassing of drilling mud fluid must be removed to a remote location to avoid any possibility of an explosion. To do this, it of course is necessary to capture the released gas and exhaust it. Accordingly, when the apparatus of the present invention is operating to de-gas drilling mud fluid, structure such as enclosure 148 shown in FIG. 9 must be placed atop the housing of the apparatus. Enclosure 148 includes a forward hood portion 150 adapted to be disposed over the mud compactor/de-gassing unit. An exhaust unit portion 152 disposed behind enclosure 150 contains a blower unit and an exhaust outlet 154. The blower unit creates a negative pressure within hood 150 causing a flow of air and gases from hood 150 into exhaust unit 152. The air and gases are exhausted through outlet 154 to a safe location.

Enclosure 148 can take on many forms and have several different features. However, it has been found advantageous to provide enclosure portion 150 with opening swing-up doors 156, 158 in order to provide easy access to the interior of the apparatus. Similarly, the enclosure portion 152 is provided with lift-up doors 160 on each side.

Figure 9:
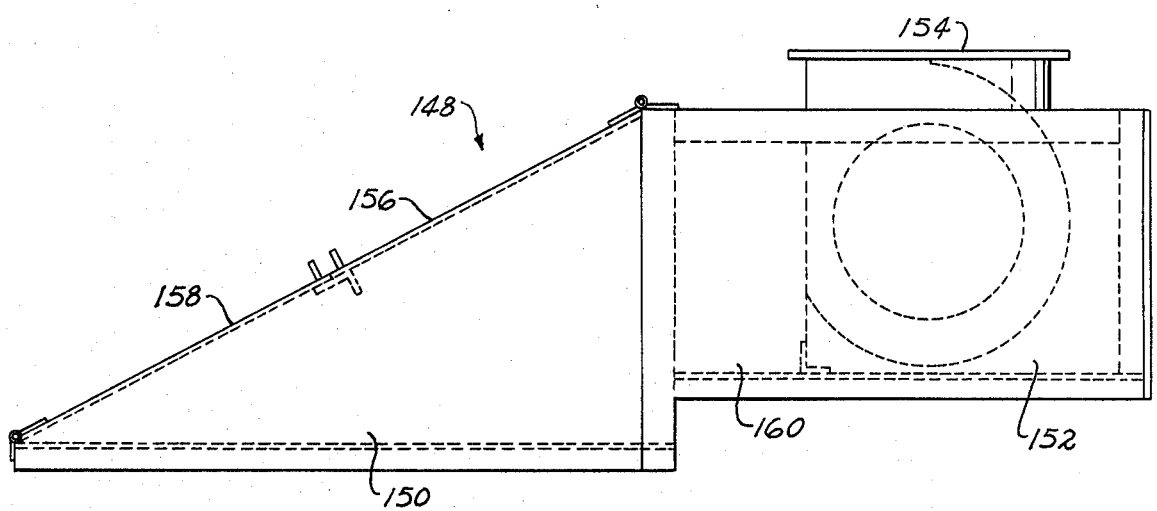
FIG. 9 is a side elevation view of a de-gasser enclosure hood for placement atop the housing of the apparatus of FIGS. 1-4.

In order to more completely depict the apparatus providing a de-gassing function, which includes the placement of enclosure 148 atop the apparatus housing, the drawing of FIG. 10 shows the apparatus of FIGS. 1-4 with the enclosure hood of FIG. 9 in place thereon.

The foregoing description of the present invention has been directed to a particular embodiment thereof for purposes of explanation and illustration. It will be apparent, however, to those skilled in this art that many modifications and changes in the embodiments shown may be made without departing from the teachings of the present invention. Accordingly, that subject matter which Applicant regards to be his invention is set forth in the following claims.

What is claimed is:

1. Apparatus for separating cuttings from drilling mud, which comprises:
    a housing having laterally spaced, upwardly standing sidewalls defining an open area therebetween;
    means for directing cutting-laden drilling mud into the open area of the housing;
    a traveling belt screen having a planar surface for receiving in an area thereof cutting-laden drilling mud and separating the cuttings therefrom,
    the planar screen surface being upwardly inclined in the direction of screen travel, so as to form a puddle of drilling mud over an aft portion of the planar surface;
    a mud compaction plate resiliently mounted in the housing opening for vertical movement, the plate extending substantially parallel to the planar screen surface for immersion in the puddle of mud forming thereon; and
    a vibrator coupled to the mud compaction plate for imparting vertical vibrational movement to the plate to force penetration of drilling mud through the planar screen surface.

2. The apparatus of claim 1 further comprising:
    a tray forming a reservoir underneath the planar screen surface for collecting drilling mud penetrating the traveling belt screen.

3. The apparatus of claim 1 wherein the traveling belt screen comprises an endless belt following a loop travel path defined by forward and aft rollers mounted in the housing open between the housing sidewalls.

4. Drilling mud cleaning and de-gassing apparatus, comprising:
    a housing having laterally spaced, upwardly standing sidewalls defining an open area therebetween;
    a filter screen disposed within the open area of the housing, for separating cuttings from drilling mud;
    means for discharging cutting-laden drilling mud into the open area of the housing;
    an auxiliary gas break-up screen disposed in the open area of the housing between the mud discharge means and the filter screen, for intercepting drilling mud in an area thereof and causing the release of gases contained in the drilling mud;
    an enclosure hood mounted atop the housing for capturing released gas; and
    a blower-driven exhaust vent unit mounted on the housing adjacent the enclosure hood for exhausting captured gas.

5. The apparatus of claim 4 wherein the auxiliary screen is mounted to the housing for vibrational movement, and wherein a vibrator is mechanically coupled to the screen to impart vibrational movement thereto.

* * * * *